United States Patent [19]

Schallis

[11] Patent Number: 5,475,202
[45] Date of Patent: Dec. 12, 1995

[54] METHOD AND APPARATUS FOR HEATING A THERMIONIC DETECTOR SOURCE

[75] Inventor: Paul E. Schallis, Ridgefield, Conn.

[73] Assignee: The Perkin-Elmer Corporation, Norwalk, Conn.

[21] Appl. No.: 397,537

[22] Filed: Mar. 2, 1995

Related U.S. Application Data

[63] Continuation of Ser. No. 792,122, Nov. 14, 1991, abandoned.

[51] Int. Cl.$^6$ ................................................ H05B 1/02
[52] U.S. Cl. .................. 219/497; 219/503; 219/507; 219/121.57; 363/26; 363/95
[58] Field of Search ............................ 219/494, 497, 219/499, 501, 505, 507, 506, 509, 503, 121.54, 121.57; 363/26, 27, 25, 49, 97, 95; 436/153; 250/287, 286

[56] References Cited

U.S. PATENT DOCUMENTS

| | | | |
|---|---|---|---|
| 3,863,131 | 1/1975 | Muir | 321/2 |
| 4,150,424 | 4/1979 | Nuechterlein | 363/26 |
| 4,307,441 | 12/1981 | Bello | 363/25 |
| 4,598,351 | 7/1986 | Fair et al. | 363/49 |
| 4,660,136 | 4/1987 | Montorefano | 363/26 |
| 4,890,214 | 12/1989 | Yamamoto | 363/49 |
| 5,014,009 | 5/1991 | Arimoto et al. | 324/468 |
| 5,053,343 | 10/1991 | Vora et al. | 436/153 |

FOREIGN PATENT DOCUMENTS

| | | |
|---|---|---|
| 1473592 | 9/1974 | United Kingdom . |
| 2006553 | 10/1978 | United Kingdom . |

*Primary Examiner*—Mark H. Paschall
*Attorney, Agent, or Firm*—Edwin T. Grimes

[57] ABSTRACT

The bead source for the thermionic detector of a gas chromatograph is heated by the secondary winding of a transformer having a center-tapped primary and operating in the push-pull configuration. The voltage drop across the bead is compared with a preselected reference voltage and an error signal is generated. The error signal is used to control the output of a pulse width modulation control which supplies the transformer primary winding.

4 Claims, 2 Drawing Sheets

_5,475,202_

METHOD AND APPARATUS FOR HEATING A THERMIONIC DETECTOR SOURCE

This application is a continuation of application Ser. No. 07/792,122 filed Nov. 14, 1991, now abandoned.

TECHNICAL FIELD

This invention relates to thermionic detectors for use in gas chromatography. More particularly, it relates to novel method and apparatus for electrically heating the source beads of such detectors.

BACKGROUND ART

One of the thermionic detectors employed in gas chromatography, primarily for nitrogen and phosphorous detection, employs a heated source comprising a glass bead containing an alkali metal such as rubidium or cesium. The bead is formed on a platinum wire and is positioned at the outlet of a chromatographic column. It is heated to provide a source of alkali metal ions. One method of heating is by means of an electrical current which is passed through the platinum support wire. When employed as a nitrogen detector in gas chromatography, the voltage across the bead must be stable to one part in twenty-five thousand (1:25,000) or better, with a system time constant of 50 msec, in order to obtain the desired detection limit.

One method used in the prior art for heating the detector bead employs closed loop d.c. control. A desired current of approximately 5 amperes through the bead, combined with a voltage across the bead of approximately 0.7 volt, results in a bead power requirement of 3-3.5 watts. However, in order to achieve that, it was necessary to start out with a 5 volt power supply. This is very inefficient in that the power supply transformer requires approximately 50 watts on the primary side in order to achieve the needed 3.5 watts at the bead. Not only is the circuit very inefficient but bulky components are required in order to dissipate the energy.

Another prior art approach employs a transformer which is a.c. coupled to the bead and wire in an open loop configuration. The voltage drop across the wire and bead is not measured. Instead, the electrical pulses supplied to the transformer are measured, but without feedback. Accordingly, it is very sensitive to any inductance in the circuitry and this makes the mechanical design difficult. Furthermore, the a.c. coupling is inefficient and the design allows for no compensation for ambient temperature changes in the transformer or load.

Accordingly, it is a primary object of the present invention to provide an electrical heating circuit for a thermionic detector source which has improved efficiency and fewer mechanical design constraints. Other objects, features, and advantages will become apparent from the following description and appended claims.

DISCLOSURE OF INVENTION

In accordance with the present invention, pulse width modulation is employed to control a transformer operating in a push-pull configuration to heat the bead. The bead voltage is measured and employed as feedback to control the modulator.

BEST MODE FOR CARRYING OUT THE INVENTION

Figure 1:
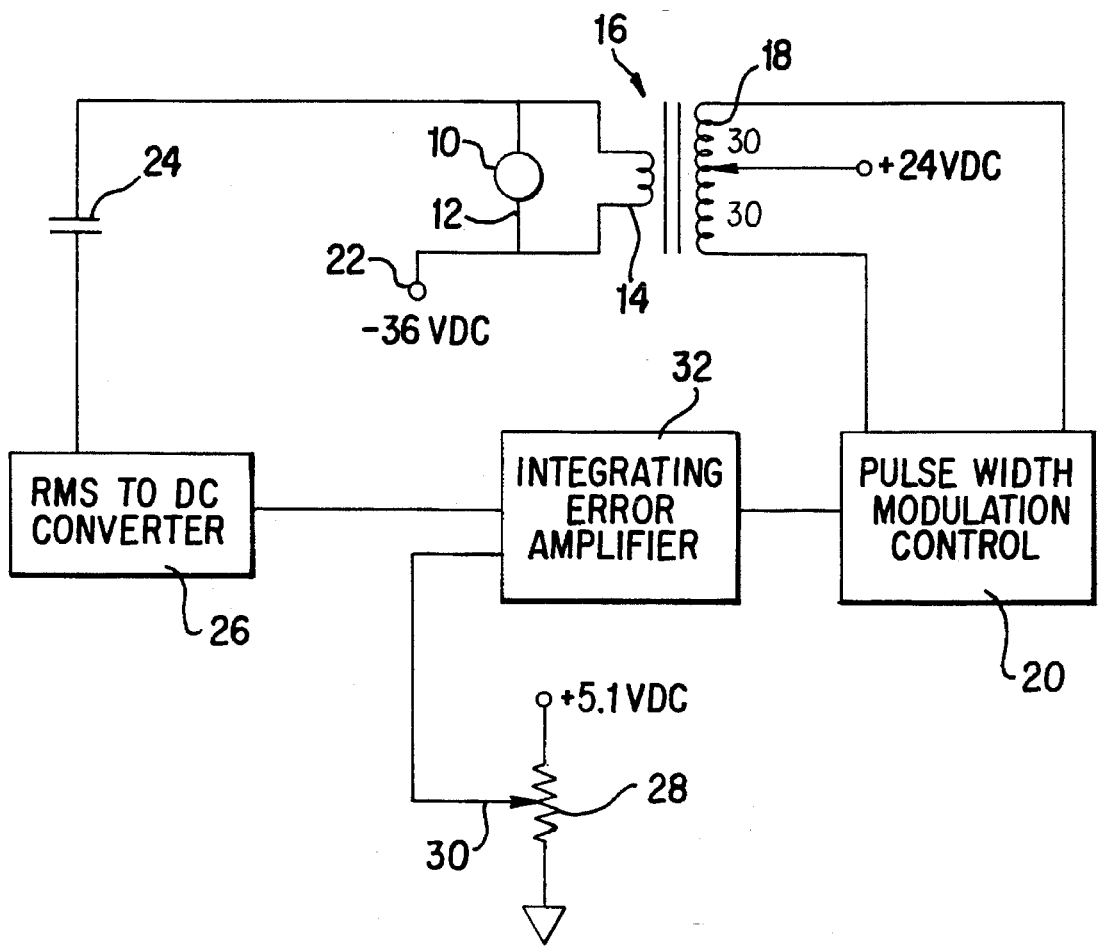
FIG. 1 is a block diagram of a heating circuit in accordance with the present invention.

Referring to FIG. 1, there is illustrated an NPD (nitrogen/phosphorous detector) bead 10 mounted on a short length of platinum wire 12 to function as a source element in a thermionic gas chromatographic detector. In such a detector, the platinum wire 12 might have a diameter of 0.007 inch and be 5 mm in length.

The bead 10 is heated by controlling the voltage drop across the platinum wire 12. The bead voltage is driven by a 2 turn secondary winding 14 of a bead transformer 16. The bead transformer 16 has a toroidal core upon which is also mounted a 60 turn center-tapped primary winding 18 operated from a 40 KHz pulse width modulated controller 20. The bead 10 is polarized by tying the floating transformer secondary winding 14 to a −36 volt d.c. source 22. The other side of the secondary winding 14 is a.c. coupled through a capacitor 24 to an RMS to DC converter 26.

The nominal 1 volt RMS signal from bead 10 is converted to a 5 volt d.c. signal by the RMS to DC converter 26. A potentiometer 28 is adjusted so that its wiper 30 provides a desired bead voltage setpoint. This setpoint is compared with the actual bead voltage applied by the converter 26 and the difference is integrated by an integrating error amplifier 32. The output from the integrating error amplifier 32 controls the pulse width modulated control circuit 20 which supplies the center-tapped primary winding 18 of the transformer 16, operating in a push-pull configuration.

Figure 2:
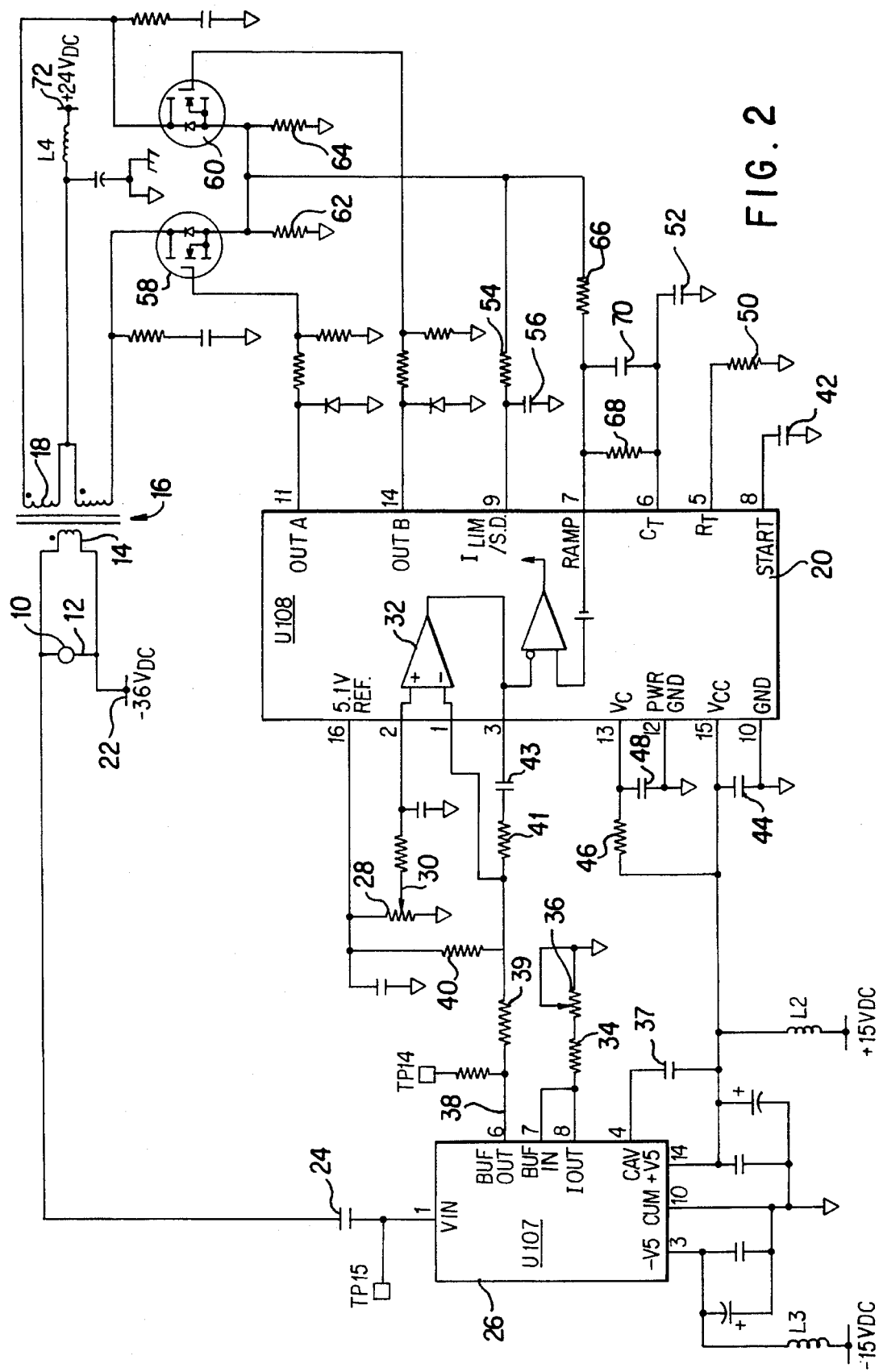
FIG. 2 is a schematic diagram illustrating the circuit of FIG. 1 in more detail.

A more detailed description of the invention may be had by reference to the schematic diagram of FIG. 2. The RMS to DC converter 26 is an Analog Devices Model AD536A. The pulse width modulated controller 20, which includes the integrating error amplifier 32, is part number UC3825 from Unitrode.

The nominal 1 volt RMS signal from the capacitor 24 is converted by the RMS to DC converter 26 to a 5 volt d.c. signal with capacitor 37 setting the averaging time constant and with resistor 34 and trimming potentiometer 36 setting a gain of 5. This output is thus equivalent to the voltage across the bead 10, but scaled. The error amplifier 32 compares and integrates the difference of the scaled bead voltage signal on line 38 with the setpoint provided by the wiper 30 of potentiometer 28. The integrator gain and time constant is set by resistors 39, 41 and capacitor 43. The threshold resistor 40 prevents control pulses from being generated prior to the setpoint exceeding 0.75 volt. A soft start capacitor 42 keeps the pulse width modulated controller 20 shut down following a reset condition until the soft start capacitor 42 has charged to approximately 1 volt or higher. Capacitor 44 provides decoupling for the internal logic supply. A filter circuit comprising resistor 46 and a capacitor 48 decouple the gate current power supply (Vc). A resistor 50 and capacitor 52 set the internal oscillator to approximately 80 KHz. A filter circuit comprising resistor 54 and capacitor 56 prevent the turn on current spike of the HEXFETs 58, 60 from triggering the current limit or current shut down protection features of the controller.

Assuming that the NPD bead 10 requires a 50% on-off duty cycle, output A of the pulse width modulated controller 20 will pulse to +15 volts for 6.25 microsecs. and then off for 18.75 microsecs. Output B will do the same but will be delayed 12.5 microsecs. (1 cycle) The pulse from output A to the gate of HEXFET 58 will drive it into conduction. As a result, the 24 volt d.c. from source 72 will be connected to ground through one half of primary winding 18. This results in a +1.5 volts peak from the secondary winding 14 driving the bead 10. A similar result occurs when the other half of the primary winding 18 is grounded through HEXFET 60 in the classic push-pull configuration. The resultant secondary voltage is superimposed on the −36 volt d.c. polarizing voltage derived from source 22 on which the secondary winding floats.

During conduction, the current in primary winding 18 is limited to approximately 2 amperes by sensing the voltage developed across the parallel sum of the resistors 62, 64. Approximately 25% of the voltage developed across resistors 62, 64 is fed back via resistors 66, 68 and capacitor 70 to control the symmetry of adjacent pulses. These components also supply the ramp voltage to controller 20 by tapping the voltage developed across capacitor 52. The ramp voltage builds until it reaches 1.25 volts below the value of the voltage at the output of the error amplifier 32. At that point, the pulse stops. Accordingly, the length of time that each half of the primary winding 18 of transformer 16 is shorted to ground is determined by the length of time it takes the ramp voltage to reach the error voltage. Thus, the length of the pulses is established by the integrating error amplifier but the symmetry of the pulses is established by the pulse width modulated controller itself.

It is believed that the many advantages of this invention will now be apparent to those skilled in the art. It will also be apparent that a number of variations and modifications may be made in this invention without departing from its spirit and scope. For example, it would be possible to measure the current in the transformer primary, in addition to measuring the voltage across the bead. In that manner, the method of this invention could be employed to control the power dissipated by the bead. The power dissipated in the bead wire could be compared with the reference voltage (instead of the a.c. voltage across the source) to produce the error signal. In fact, many other electrical characteristics could be compared with the reference voltage to produce the error signal. These might include, for example, secondary current, primary current, power (secondary current times secondary voltage), or resistance (secondary voltage divided by secondary current). In the following claims the term "electrical characteristic of the source" is to be understood as including, but not being limited to, all the foregoing. Accordingly, the foregoing description is to be construed as illustrative only, rather than limiting. This invention is limited only by the scope of the following claims.

I claim:

1. Apparatus for heating an ion source of a thermionic detector for gas chromatography which comprises, a bead mounted on a platinum wire, said wire being about 0.007 inch in diameter and about 5 mm. in length;

a transformer having a center-tapped primary winding and a secondary winding;

said platinum wire being connected to said secondary winding, means for passing a current from said secondary winding through said bead;

means for establishing a preselected d.c. reference voltage;

means for comparing a voltage drop of said source with said reference voltage including an RMS to DC converter for converting the voltage drop across said source from a.c. to d.c. and producing an output;

means for producing an error signal proportional to the difference between said reference voltage and said RMS to DC Converter output; and means comprising an about 40 KHz pulse width modulated controller for alternately supplying electrical pulses to either half of said center-tapped primary winding and shaping said pulses by said error signal to minimize said error signal.

2. Apparatus for heating an ion spurce of a thermionic detector for gas chromatography which comprises:

a bead mounted on a wire; a toroidal core bead transformer having about a 60 turn center-tapped primary winding and about a two turn floating secondary winding, said wire being connected across said secondary winding to heat said bead, a source of about minus 36 volt d.c. voltage is coupled to one side of said secondary winding to polarize said bead, and a RMS to DC converter coupled through a capacitor to the other side of the secondary winding, said RMS to DC converter converting a nominal 1 volt RMS signal from said bead to an about 5 volt d.c. signal, a potentiometer having a wiper for providing a desired bead voltage setpoint, an integrating error amplifier for comparing output voltage from said potentiometer and actual bead voltage applied by said RMS to DC converter, an about 40 Khz pulse width modulated controller circuit being connected to said primary winding, output from said integrating error amplifier being connected to control said pulse width modulated control circuit, operating in a push-pull configuration.

3. Apparatus according to claim 2 wherein said wire is a platinum wire having a diameter of about 0.007 inches and a length of about 5 mm.

4. Apparatus for heating an ion source of a thermionic detector for gas chromatography which comprises:

a bead mounted on a wire; a toroidal core bead transformer having an about 60 turn center-tapped primary winding and a two turn floating secondary winding, said wire being connected across said secondary winding to heat said bead, a source of about minus 36 volt d.c. voltage being coupled to one side of said secondary winding to polarize said bead, and an RMS to DC converter coupled through a capacitor to the other side of the secondary winding, said RMS to DC converter serving to convert a nominal 1 volt RMS signal from said bead to an about 5 volt d.c. signal with a capacitor setting an average time constant and with a resistor and trimming potentiometer setting a gain of about 5 volts, whereby the gain is substantially equivalent to the voltage across the bead, but scaled; a potentiometer having a wiper for providing a desired bead voltage setpoint, an integrating error amplifier for comparing and integrating the difference of the scaled bead voltage from said RMS to DC converter with the setpoint provided by the wiper of said potentiometer, said integrating error amplifier outputting a signal to control an about 40 Khz push-pull configured pulse width modulated controller circuit which is connected to said primary winding to supply an about +1.5 volt peak from the secondary winding to drive said bead, said control signal from said integrating error amplifier serving to control the length of the pulses.

* * * * *